(12) United States Patent
Nichols

(10) Patent No.: US 6,230,433 B1
(45) Date of Patent: May 15, 2001

(54) PERPENDICULARY RESTRAINING LURE

(76) Inventor: David Nichols, 8415 Lavenham, San Antonio, TX (US) 78250

( * ) Notice: Subject to any disclaimer, the term of this patent is extended or adjusted under 35 U.S.C. 154(b) by 0 days.

(21) Appl. No.: 09/427,523

(22) Filed: Oct. 26, 1999

Related U.S. Application Data

(60) Provisional application No. 60/107,340, filed on Nov. 6, 1998.

(51) Int. Cl.$^7$ ...................................... A01K 85/00
(52) U.S. Cl. .......................... 43/42.53; 43/44.2; 43/42.39
(58) Field of Search ............... 43/42.39, 42.53, 43/44.2, 44.8, 44.81

(56) References Cited

U.S. PATENT DOCUMENTS

| | | | |
|---|---|---|---|
| 3,293,791 | * | 12/1966 | Hinkson ................................. 43/44.4 |
| 3,377,734 | * | 4/1968 | Snow ................................... 43/42.24 |
| 3,393,465 | * | 7/1968 | Powell ................................ 43/42.28 |
| 3,645,031 | * | 2/1972 | Egles ...................................... 43/44.2 |
| 3,979,853 | * | 9/1976 | Storm et al. ........................ 43/42.29 |
| 4,848,023 | * | 7/1989 | Ryder et al. ........................... 43/44.2 |
| 5,222,321 | * | 6/1993 | Lu ....................................... 43/42.53 |

* cited by examiner

Primary Examiner—Kurt Rowan
(74) Attorney, Agent, or Firm—Gunn, Lee & Keeling

(57) ABSTRACT

The invention is directed toward a lure having means of anchoring or restraining bait or soft plastic bodies. The lure utilizes a perpendicular insert to restrain bait such that a properly placed bait may not be removed from the lure intact without prior removal of the insert. The lure has an insert receptacle specially adapted for securing bait to the lure. The lure is specially designed to receive inserts in the form of commonly available materials such as tooth picks, wire or string.

7 Claims, 1 Drawing Sheet

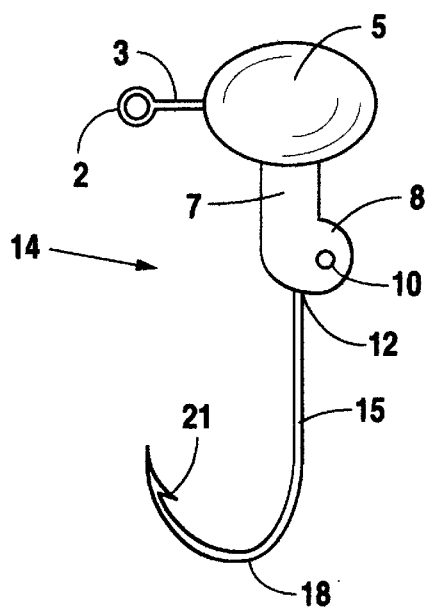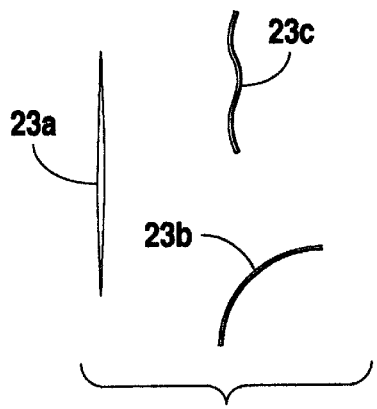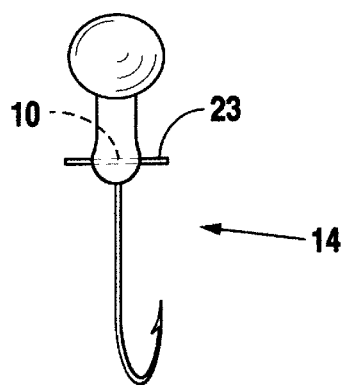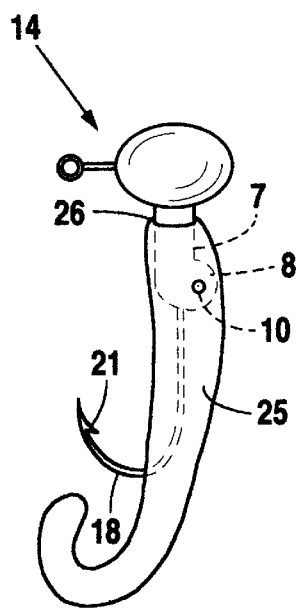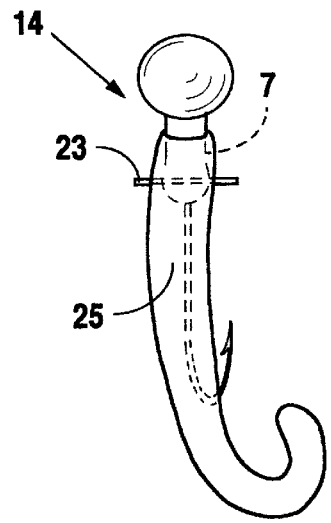

PERPENDICULARY RESTRAINING LURE

This application claims the benefit of U.S. Provisional Application No. 60/107,340 filed Nov. 6, 1998.

BACKGROUND OF THE INVENTION

1. Field of the Invention

The present invention relates to fishing lures for use with fishing poles or rods and reels, and more particularly, to an improved lure capable of restraining bait such as artificial plastic grubs or live grubs or minnows, with use of a perpendicular insert and an insert receptacle.

2. Background Information

Throughout the United States, lures are constructed with hooks having a reverse barb. The reverse barb is an enlarged portion of a lure around which an anchored bait rests. The reverse barb is shaped so as to encourage placement of the bait around the lure while discouraging removal of the bait by fish or other natural means. Additional features of the hook such as its curved base or barbed end may also perform this function to a lesser degree.

Lures which have a reverse barb as the primary means of anchoring bait to the lure are unable to adequately secure the bait so as to completely prevent removal of the entire body of the bait. The reverse barb discourages bait removal to a limited degree, but cannot alone prevent its removal of the bait intact. Once sufficient external force exists pulling the bait away from the lure, the entire bait body will be separated from the lure intact unless anchored by some other means. In basic terms the bait is now completely removed from the hook and the fish has had a free meal if fortunate enough not to be hooked by the lure in the process. This problem is only addressed to a small degree by the use of a reverse barb or other hook features of the prior art lures. Another type of lure utilizes multiple collars that act to hold grubs on to the hook.

The present invention can discourage bait removal to a much higher degree by providing a perpendicular restraint means of securing the bait or soft plastic bodies to the lure. The lure has an insert receptacle specially adapted for securing bait, or soft plastic bodies, live or otherwise, to the lure. The security provided by the insert receptacle is particularly due to the fact that it may receive a properly sized insert which has been passed through the body of a bait attached to the lure. The lure may be of varying sizes and the insert may be of various linear forms such as a toothpick, wire or string. The insert receptacle may be of varying sizes with the appropriate insert size based on the size of the insert receptacle. The present invention can apply to any lead headed lures, or other metalized headed lures including but not limited to Jigheads, Spinnerbaits, Buzz Baits, Flipping & Casting Baits, Worm Weights, Crappie Jigs, and all other Jigheads with collars.

SUMMARY OF THE INVENTION

It is an object of the present invention to provide a perpendicularly restraining lure capable of securing a bait to the lure with use of a perpendicular restraint means.

It is another object of the present invention to provide a perpendicularly restraining lure with an insert receptacle capable of receiving a perpendicular insert.

It is another object of the present invention to provide a perpendicularly restraining lure which is accompanied by a perpendicular insert.

It is yet another objective of the present invention to provide a method of adapting and securing a bait to a perpendicularly restraining lure.

It is a further object of the present invention to provide a perpendicularly restraining lure which may be used in conjunction with commonly available materials to be used as a perpendicular insert.

It is another object of the present invention to provide a perpendicularly retraining lure which may be of multiple sizes.

It is still an object of the present invention to provide a perpendicularly restraining lure which may accommodate various types of baits.

It is a further object of the present invention to provide a perpendicularly restraining lure which anchors bait so as to prevent intact removal.

It is yet another object of the present invention to provide a perpendicularly restraining lure which anchors bait so as to prevent removal without removal of the insert.

In satisfaction of these and related objectives, the present invention provides a lure with a perpendicular restraining means. Applicant's invention permits it practitioner to anchor bait to the lure such that intact removal of the bait is virtually impossible without prior removal of the insert.

BRIEF DESCRIPTION OF THE DRAWINGS

FIG. 1 is a right side view of the lure.

FIG. 2 is a depiction of the various types of inserts which may be used with the lure, such as a toothpick (23a), wire (23b), or fishing line (23c).

FIG. 3 is a rear view of the lure illustrating placement of a perpendicular insert.

FIG. 4 is a right side view of the lure depicting placement of a bait on the lure prior to placement of a perpendicular insert.

FIG. 5 is a rear view of the lure illustrating a baited lure with placement of a perpendicular insert.

DESCRIPTION OF THE PREFERRED EMBODIMENT

FIG. 1 is a right side view of the lure referring to this figure, a lure is shown composed of an eye (2) secured to the head (5) of the lure by a stem (3). The head (5) of the lure is secured to the top of a neck (7) having a perimeter (8). The perimeter (8) of the neck (7) defines an insert receptacle (10) which makes possible a perpendicular securing means. Extending downward from the base (12) of the neck (7) is a hook (14) having a body (15), a base curve (18), and a barb (21). The hook (14) is for slipping bait (not shown) onto the lure. The neck (7) may have varying features including a reverse barb, a double reverse barb and/or multiple collars.

Referring to FIG. 2, a toothpick (23a), wire (23b), and fishing line (23c) are shown. These are typical items which may be used as perpendicular inserts (23) (See FIG. 3) through the inert receptacle (10) (See FIG. 1).

Referring to FIG. 3, the rearview of a lure is shown with a perpendicular insert (23) secured within an insert receptacle (10) of the lure. The perpendicular insert (23) may be of the types shown in FIG. 2 or specially made and fitted for the particular lure and insert receptacle (10) used. A fitted perpendicular insert (23) and receptacle (10) may be designed with any common keying system such that accidental separation may be avoided and the perpendicular insert (23) stored within the insert receptacle (10) for safekeeping when not in use.

Referring to FIG. 4, the right side of a baited lure is shown prior to placement of the perpendicular insert (23) (See FIG.

3). The bait (25) is shown having a mouth (26) encompassing the entire hook (14) and neck (7) of the lure. The body of the bait (25) covers all sides of the perimeter (8) and insert receptacle (10). To a certain degree the barb (21) and base curve (18) may act to oppose any forces which may encourage removal of the bait (25) from the lure in a direction opposite of the mouth (26). However, without proper placement of the perpendicular insert (23) (See FIG. 3), intact removal of the bait (25) in a direction opposite the mouth (26) is still possible.

Referring to FIG. 5, the perpendicularly restraining lure is shown in an operable form with placement of the perpendicular insert (23). The bait (25) is shown secured around the hook (14) and neck (7) as in FIG. 4. However, the perpendicular insert (23) has now been inserted into the body of the bait (25) and through the insert receptacle (10) of the lure, exiting through an opposite side of the body of the bait (25). In this manner the bait (25) has been secured to the lure such that it may not be removed without disintegration of the portion of the bait (25) above the perpendicular insert (23). The bait (25) is now secured to the lure to at least the degree of integrity of the bait (25) itself. The odds of the fish having its free meal of the entire bait have now been virtually eliminated.

Although the invention has been described with reference to specific embodiments, this description is not to be construed in a limited sense. Various modifications of the disclosed embodiments, as well as alternative embodiments of the invention will become apparent to persons skilled in the art upon reference to the description of the invention. It is therefore contemplated that the appended claims will cover such modifications that fall within the scope of the invention.

I claim:

1. A restraining fishing lure for securing bait to said lure comprising:
    a hook for slipping bait onto said lure having a first end and a second end, said second end having a base curve wherein said base curve comprises at least one barb;
    a neck attached at said first end of said hook said neck comprising a cylindrical region and nodular region extending outward from said cylindrical region,
    a head attached to an end of said neck opposite said nodular region;
    an insert receptacle positioned through said nodular region of said neck;
    an insert removably inserted through said insert receptacle for anchoring said bait to said lure; and
    a means for securing said lure to a fishing pole or rod and reel attached to said head.

2. The restraining fishing lure of claim 1 wherein said insert is positioned perpendicular to a longitudinal axis of said lure.

3. The restraining fishing lure of claim 2 wherein said insert receptacle is positioned perpendicular to a longitudinal axis of said lure.

4. The restraining fishing lure of claim 3 wherein said means for securing said lure to a fishing pole or rod and reel comprises a head directly attached to said neck, a stem secured at one end to said head, and an eye secured at a second end of said stem.

5. A method of securing bait to a restraining fishing lure comprising the steps of:
    first selecting an appropriate lure for a bait type and fish type;
    second selecting an appropriate bait for said fish type;
    third inserting one end of said bait over a base curve of a hook on said lure until said bait has engulfed said hook and a nodular region of a neck portion of said lure above said hook, and wherein said nodular region of said neck portion has an insert receptacle;
    fourth inserting an insert through one side of said bait engulfed over said nodular region of said neck portion, into and through said insert receptacle, and out the opposite side of said bait engulfed over said nodular region of said neck portion thus securing said bait to said lure such that said bait may not be removed from said lure without disintegration of a portion of said bait above said insert.

6. The method of claim 5 wherein said fourth inserting step occurs at a perpendicular to said hook.

7. The method of claim 6 wherein said third inserting step comprises a hook with at least one barb.

* * * * *